BEST AVAILABLE COPY

June 7, 1938. C. BOCCA Re. 20,748

METHOD FOR SUPERPOSING PARTIAL IMAGES OF POLYCHROMATIC SELECTION AND PROJECTING THEM TO OBTAIN AN IMAGE IN NATURAL COLORS

Original Filed July 21, 1933

INVENTOR:
CARLO BOCCA
BY Haseltine, Lake & Co.
ATTORNEYS

Reissued June 7, 1938 BEST AVAILABLE COPY Re. 20,748

UNITED STATES PATENT OFFICE 20,748

METHOD FOR SUPERPOSING PARTIAL IMAGES OF POLYCHROMATIC SELECTION AND PROJECTING THEM TO OBTAIN AN IMAGE IN NATURAL COLORS

Carlo Bocca, Vigevano, Italy

Original No. 2,050,417, dated August 11, 1936, Serial No. 681,472, July 21, 1933. Application for reissue November 25, 1936, Serial No. 112,708. In Germany August 8, 1932

1 Claim. (Cl. 88—16.4)

The present invention concerns a method for printing photographic images obtained by trichromatic or bichromatic selection by superposing them and for projecting them so as to get a single image in natural colors.

The method which forms the preferred embodiment of this invention will be set forth in connection with a trichromatic selection, and a practical manner of practicing the invention will also be illustrated in this connection, although I do not intend to limit my invention to such trichromatic selection or group since it can evidently be employed for a color group other than trichromatic.

Hence, the arrangements for carrying out the invention are schematically illustrated in the accompanying drawing, in which.

The printing method is as follows:

Of the subject to be reproduced, three partial diapositives are prepared by the known method of trichromy, and to this end, three partial negatives of the subject are first taken through three colored filters (generally red, green and violet) and from these the corresponding diapositives are printed.

(Hereinafter we shall term "red diapositive" the diapositive corresponding to the partial negative obtained with the red filter, and similarly, "green diapositive" and "violet diapositive" the others.)

From these diapositives, the first print is produced (for instance, from the red diapositive) on a plate film or any other suitable support, coated with a photographic emulsion or bichromate gelatine or some other suitably sensitized colloid.

The printing is carried out by known contact or projection methods with the interposition of a parallel-line reticule or grating; the lines being sufficiently numerous to be useful for the present purpose as known in the art, and have a determined direction for each color, this being in the instant example a vertical direction.

Then another of the three diapositives is printed on the same plate or film, while again interposing the same grating and ascertaining that the corresponding parts of the image are accurately matched or superposed. The interposed reticule is the same, but is partly turned in this case, so that its lines are inclined (for instance, 60° to the left) with respect to the vertical lines just mentioned. Finally, the violet diapositive is printed by interposing the same reticule but disposed with its lines inclined (for instance, 60° to the right) with respect to the said vertical lines. In each case the reticule is in a position which will cause its lines to appear as sharply as practicable in the appropriate portions of the diapositive.

The plate or film thus printed is then developed and fixed and thereby becomes the projection diapositive.

Figure 1:
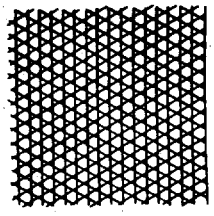
Fig. 1 shows the final structure of a diapositive produced by means of the present invention and corresponding to the white areas of the photographed subject.

This diapositive is formed by the superposition of three ruled images. The three systems of lines, corresponding to the three different positions given to the lines of the reticule, will not, however, all be present upon the entire projection diapositive, for all three systems will appear only in those parts corresponding to the white areas of the subject photographed, while on the other parts only one system or two systems of lines will appear. The white parts will, in fact, have corresponding transparent zones on all three of the partial diapositives; therefore, in the successive printing of these, which is done with interposition of the reticule, the lines of the reticule will always be printed on the projection diapositive in the three positions given to them. In the white parts the structure of the projection diapositive will thus appear as shown in Fig. 1. The contrary occurs for the black parts of the subject: in correspondence with these the projection diapositive will not contain any ruling. The red parts of the subject will be represented by transparent zones only on the red diapositive and by relatively opaque zones on the green and violet diapositives: thus in the parts of the projection diapositive which correspond to the red parts of the subject, the lines will be present only in the position given to them while printing the red diapositive. The case will be analagous for the green and the violet parts.

The parts of the subject colored in one of the fundamental colors of trichromy will therefore have corresponding zones in the projection dia-

BEST AVAILABLE COPY positive upon which the reticule lines appear only in the direction given to them while printing the partial diapositive corresponding to said color. Likewise, the parts of the subject colored with composite colors will have corresponding zones on the projection diapositive in which the reticule lines appear in the two or more positions given to them while printing the partial diapositives corresponding to the fundamenal colors of which the composite colors are formed. Thus, for example, the yellow parts of the subject will have corresponding zones in the projection diapositive in which the reticule lines occupy the position given to them while printing the green and the red diapositive: and it is well known, in fact, that in additive trichrome synthesis, yellow is formed by the sum of red and green.

To better explain how from this projection diapositive an image in natural colors of the subject photographed is obtained in projection, it may perhaps be advisable to point out one of the properties of crossed reticules.

In diffraction reticules or gratings with parallel lines it is well known that, if on a reticule of this kind a pencil of rays emanating from a punctiform luminous source is caused to fall and a lens is arranged before or after the reticule, numerous images of the luminous source, instead of a single image, appear upon a white, opaque screen disposed at the focus of the lens, all the said various images being aligned perpendicularly to the lines of the reticule and symmetrically to the central image, the latter image being clearly recognizable because it is white, whereas the other images are diffraction spectra.

Figure 2:
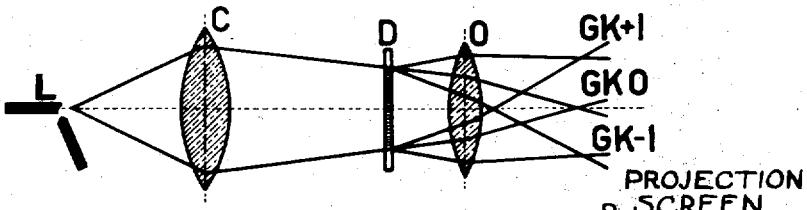

What occurs in these circumstances, is shown in Fig. 2, in which L represents a luminous source, C a condenser, D a diffraction reticule, O the objective lens which gives in GKO the central real image of the luminous source, in GK+1 and GK—1 two diffracted images of the source itself. The two images GK+1 and GK−1 are diffracted images of the first order; the others formed are not shown in the figure; they are all, however, aligned with images GK+1 and GK−1.

Figure 3:
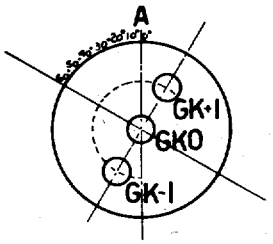
Figs. 2 and 3 show how diffracted images are formed on projection.

In Fig. 3 is illustrated the position of the central real image and that of the two diffracted images of first order when the lines of the reticule have the direction indicated by the arrow.

If with the said reticule a further reticule is combined, in such a manner that the lines of the second reticule are inclined at a certain angle to the lines of the first reticule, a second set of images of the luminous source appears on the white screen. This second set of images has in common with the first set the central image, but the remaining images are diffracted in a different direction with respect to those of the first set, and they are in fact diffracted in a direction normal to the lines of the second reticule.

It is plain that all the diffracted images that have appeared by the interposition of the second reticule are produced by the lines of the second reticule only.

If a third reticule is coordinated with the first two reticules in such manner that its lines incline at a certain angle to the lines of the other two, there will appear on the white screen a third set of images, which has the central image in common with the central image of the first and second sets, while the other images will be disposed in a different direction from those of the first and second sets, i. e. in a direction perpendicular to the lines of the third reticule.

Thus a system formed of a bundle of parallel lines close to one another, when crossing other similar bundles, has the property of altering the direction of the luminous rays impinging upon it and diffracting the light in as many directions as there are bundles forming the system.

The projection diapositive obtained according to this invention therefore has the same optical properties as such a system. In projection on a plane it gives images of a luminous source or of other optically equivalent devices, which images are diffracted perpendicularly to the lines of the three ruled images of which it is composed.

Figure 4:
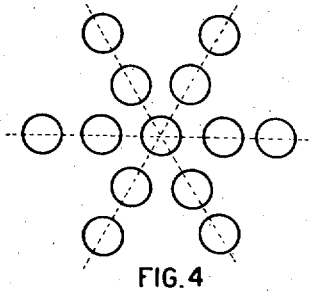
Fig. 4 shows schematically the star shape taken by the image of a luminous source or of any other optically equivalent device, such as a hole in an opaque and strongly illuminated screen, when diffracted according to directions mutually disposed at angles of 60°.

Hence, as already indicated, the image of the luminous source thereby takes the star shape shown in Fig. 4; that is to say there will be three sets of images placed along three different directions and having in common the central image while the other (diffracted) images will be distinct. The diffracted images formed along each direction are those due to the ruling the lines of which are perpendicular to this direction; which is equivalent to saying that the images of the luminous source, diffracted by the three ruled images whose superposition forms the projection diapositive, form in three different directions. Thus according to one of the three directions of Fig. 4 the images will be disposed corresponding to the red diapositive, according to another direction those of the green diapositive will be disposed, and those of the violet diapositive according to a third. In the plane in which these images are formed I insert a screen with colored filters, placing the red filters in the parts or directional positions in the plane in which the images form, which are diffracted by the ruling printed with the red diapositive; green filters where the images form, which are diffracted by the ruling printed with the green diapositive; and violet filters where the images form, which are diffracted by the ruling printed with the violet diapositive; and in this manner I obtain the coloring of the rays of light which have formed these images. The rays thus colored give upon a screen, placed in an appropriately distant focal plane parallel with the plane of the projection diapositive, and disposed not only beyond the objective O but beyond the focused true image of the light source on the opaque spot on the color filter screen, an image in the natural colors of the subject photographed as further explained later on.

Figure 5:
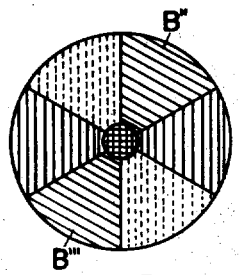
Fig. 5 shows a three color filter.

The screen with colored filters which I use in the case of trichromatic selection is of the type shown in Fig. 5; it consists of a disc divided into 6 sectors, two red, two green, and two violet. Considering the manner in which the diffracted images are formed the two sectors of the same color are diametrically opposed. The number of sectors must always be twice the number of the partial diapositives whose superposition forms the projection diapositive. Thus in the case of bichromatic selection the projection diapositive will be formed by superposition of only two partial diapositives and there would be 4 sectors.

Figure 6:
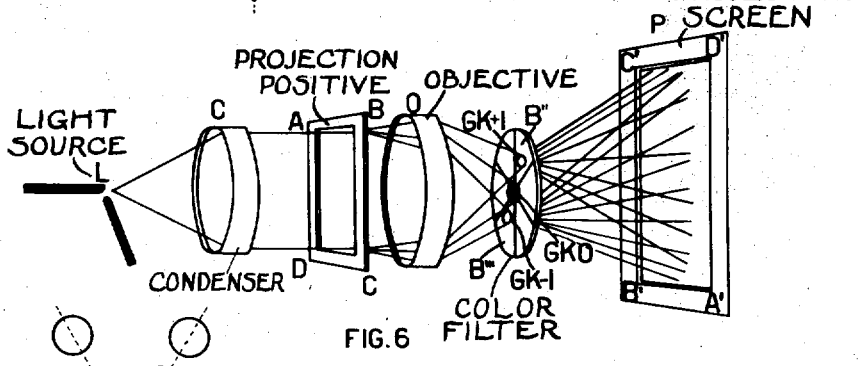
Fig. 6 shows schematically how a diapositive prepared according to this invention can be projected in colors.

In Fig. 6 is illustrated one of the systems for polychromatic projection of the diapositive obtained by the method of printing described.

L is the luminous source, C the condenser, ABCD the projection diapositive obtained according to this invention, O is the projection objective, B''—B''' is the filter with colored sectors, P is the projection screen. To simplify the figure and to make it easier to understand I have shown the course of the rays diffracted by only one of the three systems of rulings of the projec-

BEST AVAILABLE COPY tion diapositive. Let us assume, for example, that it is the one corresponding to red.

The light issuing from L is sent by means of condenser C to projection diapositive ABCD; the rulings impressed upon this diapositive will diffract the light. Objective O collects the rays issuing from ABCD and forms before it, in the plane of the filter with colored sections B''—B''', a central true image GKO of the light source and also diffracted images of said source as in GK+1 and GK—1. Image GKO is naturally intercepted by the small opaque disc (shown by the small black circle in the figure) with which the filter with colored sections is provided.

The rays of light which have formed the diffracted images are allowed to pass freely through transparent sectors B''—B''', which, being red, will transmit their color to these rays and the latter, continuing their course, go to form on screen P a red image of the red diapositive.

That there forms an image corresponding to the diapositive of red appears evident considering that only in the zones of the projection diapositive which correspond to parts of the subject colored in red, or in colors which are composite colors of red, do the reticule lines appear in the position given to said lines when the diapositive of red was printed; thus it is only from said zones that diffracted light will issue to form the images GK+1 and GK—1, and this light will become colored in red passing through filters B''—B'''. With this light, objective O creates upon the screen a red image of those zones of the projection diapositive upon which is printed the system of lines of the reticule corresponding to the diapositive of red, which is equivalent to saying, of those zones which correspond to the parts of the subject colored in red or in composite colors of red.

The same occurs with the rays diffracted by the two other ruled systems of the projection diapositive, which form on the appropriately distant projection screen P a green image of the diapositive of green and a violet image of the diapositive of violet. Looking at said projection screen P the eye thus perceives a single image in natural colors of the subject which has been photographed.

For the projection of diapositives prepared according to this invention it is, of course, possible to use the light which issues from an aperture in an opaque diaphragm which is strongly illuminated.

The method herein described can be employed advantageously for obtaining colored cinematographic projections.

Having now fully described my invention, I claim:

Method of producing projected pictures in natural colors which comprises preparing by known methods a series of partial positive images of polychromatic selection of the subject, printing upon a light-sensitive surface through a parallel-lined diffraction grating one of the partial positives, printing in succession the remaining partial positives, on the same light-sensitive surface and with the images in register, through the same grating with the lines thereof at an angle to the lines in former printing steps, illuminating the resultant complete positive with a light beam emanating from a luminous source, forming on a plane a non-diffracted real image and as many sets of diffracted real images of the luminous source as there are partial positives which had been printed in succession to obtain the complete positive, obturating the light forming the non-diffracted image, coloring the light forming each set of diffracted images with the same color as that of the color filter employed for preparing the partial positive printed with the grating lines diffracting the light forming that set of diffracted images, forming with the colored light an image of the complete positive.

CARLO BOCCA.